(12) United States Patent
Feigel

(10) Patent No.: US 7,669,831 B2
(45) Date of Patent: Mar. 2, 2010

(54) ELECTRICALLY CONTROLLABLE VALVE

(75) Inventor: Hans-Jörg Feigel, Rosbach (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 511 days.

(21) Appl. No.: 11/632,786

(22) PCT Filed: Jul. 15, 2005

(86) PCT No.: PCT/EP2005/053411

§ 371 (c)(1),
(2), (4) Date: Jan. 18, 2007

(87) PCT Pub. No.: WO2006/008272

PCT Pub. Date: Jan. 26, 2006

(65) Prior Publication Data

US 2007/0235671 A1 Oct. 11, 2007

(30) Foreign Application Priority Data

Jul. 19, 2004 (DE) .......................... 10 2004 034 896
May 18, 2005 (DE) .......................... 10 2005 022 710

(51) Int. Cl.
*F16K 31/02* (2006.01)

(52) U.S. Cl. .............................. 251/129.07; 251/129.08; 251/211

(58) Field of Classification Search ............ 251/129.07, 251/129.08, 211
See application file for complete search history.

(56) References Cited

U.S. PATENT DOCUMENTS

| | | | | |
|---|---|---|---|---|
| 2,659,197 A * | 11/1953 | Halford et al. | ............... | 251/211 |
| 2,962,041 A * | 11/1960 | Johnson | ...................... | 251/211 |
| 3,220,184 A * | 11/1965 | Oprecht | ...................... | 251/211 |
| 4,645,176 A * | 2/1987 | Ogawa et al. | .......... | 251/129.08 |
| 6,035,979 A * | 3/2000 | Forster | .................... | 188/266.6 |
| 6,247,461 B1 * | 6/2001 | Smith et al. | ............ | 251/129.07 |

FOREIGN PATENT DOCUMENTS

| | | |
|---|---|---|
| DE | 27 57 803 A1 | 7/1978 |
| DE | 38 14 156 A1 | 11/1989 |
| DE | 40 08 326 C1 | 7/1991 |
| DE | 196 24 898 A1 | 1/1998 |
| DE | 199 38 884 A1 | 2/2001 |
| EP | 1 544 525 A1 | 6/2005 |
| GB | 2 332 538 | 6/1999 |

* cited by examiner

*Primary Examiner*—John Bastianelli
(74) *Attorney, Agent, or Firm*—RatnerPrestia

(57) ABSTRACT

A controllable valve includes an axial working air gap arranged on a side of magnet armature that cooperates with a valve closure member the side facing away from the valve closure member so that upon electric actuation of the actuating drive, the valve closure member is movable by the actuating drive in the direction of the first valve seat surface.

5 Claims, 2 Drawing Sheets

US 7,669,831 B2

ELECTRICALLY CONTROLLABLE VALVE

RELATED APPLICATIONS

This application is the U.S. national phase application of PCT International No. PCT/EP2005/053411, filed Jul. 15, 2005, which claims priority to German Patent Application No. DE102005022710.4, filed May 18, 2005 and German Patent Application No. DE102004034896.0, filed Jul. 19, 2004, the contents of such patents being incorporated by reference herein.

BACKGROUND OF THE INVENTION

The present invention relates to an electrically controllable valve, in particular for use in an adjustable shock absorber.

DESCRIPTION OF THE RELATED ART

DE 196 24 898 C2 discloses electrically controllable valves for use in a shock absorber. The valves form a valve subassembly composed of one first-stage valve and one main-stage valve. In order to electrically actuate the first-stage valve, an operating magnet is provided, which is connected to a valve piston for the variable adjustment of a valve opening cross-section in the valve housing, with the valve sealing surfaces of the valve piston cooperating with a valve seat in the valve housing.

SUMMARY OF THE INVENTION

The invention relates to a valve, in particular for use in a shock absorber, which can be designed with least possible effort in such a fashion that a pressure controlling and pressure limiting function is safeguarded by employing simplest possible and functionally safe means.

BRIEF DESCRIPTION OF THE DRAWINGS

Further features and advantages of the invention can be taken from the subsequent description of an embodiment for a valve in various operating positions.

In the accompanying drawings.

DETAILED DESCRIPTION OF THE PREFERRED EMBODIMENTS

Figure 1:
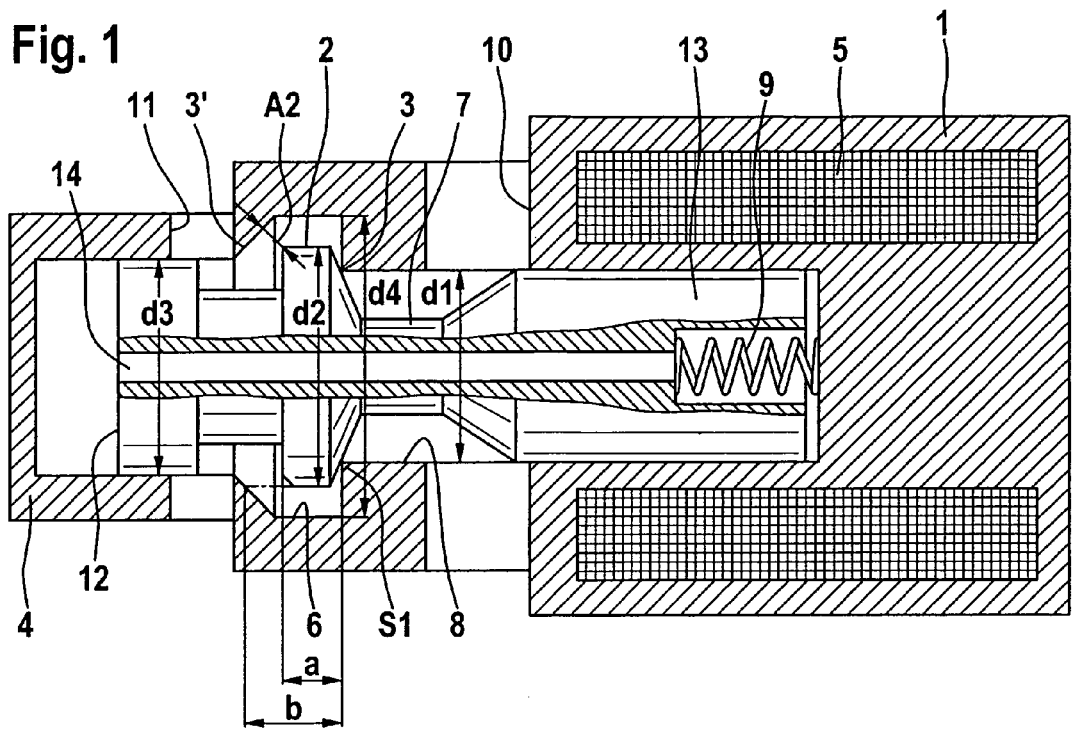
FIG. 1 is a longitudinal cross-section taken through a valve with the features on which is invention is based in a first pressure control position, in which the exciting current corresponds to the maximum electric actuating current i-max of the valve coil for actuation of a valve closure member, whereby the desired fluid flow passes through the valve under high fluid pressure, to what end a first valve opening cross-section is closed except for a restrictor orifice S1 and a second valve opening cross-section A2 that is arranged upstream thereof is completely opened.

To begin with, the principal design of the valve of the invention shall be described by way of FIG. 1 exemplarily for all illustrations.

FIG. 1 is a longitudinal cross-sectional view of an electrically operable, unidirectionally operated valve, which is preferably used for regulation of a shock absorber in a motor vehicle. The valve comprises an electric actuating drive 1, composed of a magnet armature 13 in plunger-type construction and a valve coil 5. The magnet armature 13 is connected to the valve closure member 2 by way of a tapered extension 7. The valve closure member 2 basically has the contour of a stepped piston, which is alternately movable with its two end surfaces into abutment on two valve seat surfaces 3, 3' being aligned diametrically with respect to each other in the valve housing 4. The two valve seat surfaces 3, 3' are produced by the flanks of an annular groove 6 shaped in the valve housing 4, with the width b of the annular groove and the diameter d4 of the annular groove being chosen to be larger than the width a and the outside diameter d2 of the valve closure member 2 in order to accommodate the valve closure member 2 and for passage of the fluid that comes from the inlet channel 11. Adjacent to the right flank of the annular groove 6 intended to form the first control edge 3 is a bore portion 8, which is smaller in its diameter d1 compared to the diameter d2 of the valve closure member 2 and which guides the magnet armature 13. An annular chamber that is provided between the bore portion 8 and the tapered extension 7 ensures passage of the fluid in the direction of the outlet channel 10, which opens radially into the first bore portion 8.

The inlet channel 11 opens into the valve housing 4 between the valve closure member 2 and a stepped piston 12 connected to the valve closure member 2 upstream of the second valve seat surface 3'. Like the magnet armature 13, the stepped piston 12 is construed as a plunger piston precisely guided in the valve housing 4 so that the valve closure member 2, which is arranged between the stepped piston 12 and the magnet armature 13, is movable precisely between the two valve seat surfaces 3, 3'. To allow pressure compensation for the leakage flows along the peripheral surfaces of the stepped piston 12 and the magnet armature 13 sealing metallically in the valve housing 4, the integral valve subassembly composed of the stepped piston 12, the valve closure member 2, the extension 7 and the magnet armature 13 includes a through-bore 14, which extends in the valve subassembly in longitudinal direction.

Besides, a compression spring 9 is interposed between the magnet armature 13 and the valve housing 4 in order to be able to position the valve closure member 2 in the electrically de-energized condition at the second valve seat surface 3'. In general, the sealing effect between the valve seat surfaces 3, 3' and the valve seat member 2 is achieved exclusively by contact of the edges.

Two variably adjustable valve opening cross-sections A1, A2, through which a controlled fluid flow is propagating, are obtained in the area of the annular groove 6 due to the cooperation of the valve closure member 2 with the valve seat surfaces 3, 3' when the actuating drive 1 is excited electromagnetically.

The variable second valve opening cross-section A2 is disposed upstream of the first valve opening cross-section A1 in series connection to the first valve opening cross-section A1, and both valve opening cross-sections A1, A2 are opened and closed, respectively, reciprocally in proportion to each other by means of the first valve closure member 2.

In the area of the first valve opening cross-section Al, there is a restrictor orifice S1, the restrictor cross-section whereof is smaller than a restrictor orifice S2 provided in the area of the second valve opening cross-section A2. The restrictor orifices S1, S2 are indented as notches either into the two valve seat surfaces 3, 3' or into the two end surfaces of the valve closure member 2. Depending on the volume flow Q (zone I of the family of characteristics shown in FIG. 4), the increase in pressure p can be limited in the desired manner due to the restrictor orifices S1, S2 when the valve closure member 2 moves into abutment on the first or second valve seat surface 3, 3'.

Figure 4:
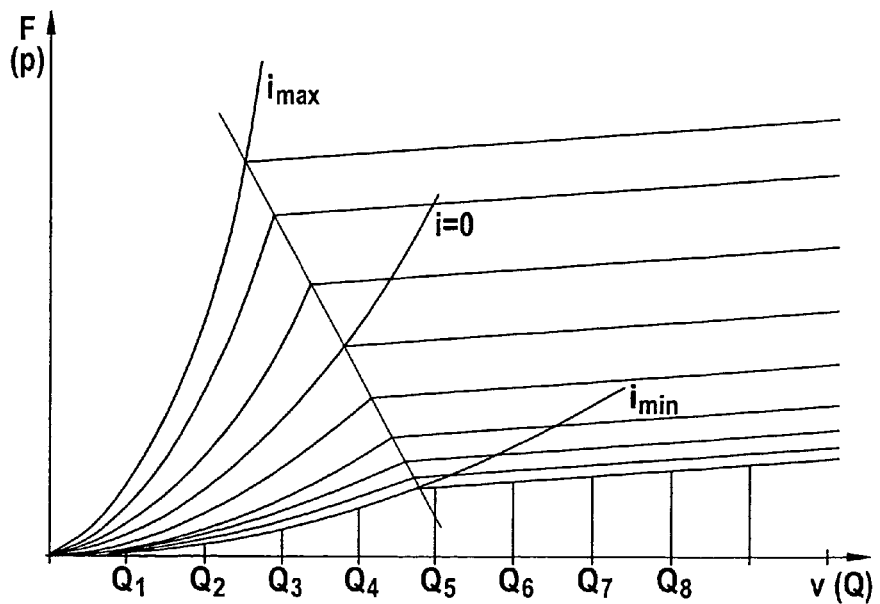
FIG. 4 shows a family of characteristics to illustrate the fluid flows, which result from the valve switch positions according to FIGS. 1 to 3.

In order to realize the family of characteristics illustrated in FIG. 4 and, thus, the desired function of the valve, the hydraulically applied surfaces of the valve subassembly must be dimensioned differently in consideration of the spring and magnet force, for what purpose the outside diameter d3 of the stepped piston 12 is smaller in size than the outside diameter d2 of the valve closure member 2, however, larger than the diameter d1 in the bore portion.

The valve is designed in such a fashion that an axial working gap XA of the electric actuating drive 1 is arranged on the side of the magnet armature 13 that cooperates with the valve closure member 2, said side facing away from the valve closure member 2, so that the valve closure member 2 is movable from its rest position on the second valve seat surface 3' in the direction of the first valve seat surface 3 when the actuating drive 1 is electrically actuated.

Due to the different effective diameters of the valve subassembly, the valve closure member 2 is not pressure-balanced hydraulically so that the family of characteristics shown in FIG. 4 is achieved in consideration of the compression spring 9 interposed between the valve closure member 2 and the actuating drive 1.

Taking into account the design of the magnet armature 13 that is favorable in terms of flow, the hydraulic flow forces that develop when fluid flows through the valve are compensated at least partly by the drafted geometry of the valve closure member 2 in interaction with the valve seat surfaces 3, 3'.

The different valve positions as well as the associated characteristic curves will now be illustrated in the following exemplarily with reference to FIGS. 1 to 4.

FIG. 1 shows the valve including the features of the invention in a first pressure control position, in which the exciting current corresponds to the maximum electric actuating current of the valve coil 5 fitted at the valve housing 4. Due to the maximum exciting current imax, the magnet armature 13 maintains the valve closure member 2 on the first valve seat surface 3 in opposition to the effect of the resetting spring 5 so that, initially, the fluid flow under high pressure p propagates exclusively through the restrictor orifice S1 from the inlet channel 11 to the outlet channel 10. The course of characteristic curves in the zone I of the family of characteristics is achieved due to the effect of the restrictor orifice S1. Starting from a defined fluid flow Q through the valve, the pressure p is so high that the valve closure member 2 lifts from the first valve seat surface 3 due to the hydraulically applied end surfaces of the valve subassembly, in opposition to the effect of the magnet force, which causes flattening of the further course of the characteristic curves in FIG. 4 (zone II of family of characteristics, characteristic curve imax).

Figure 2:
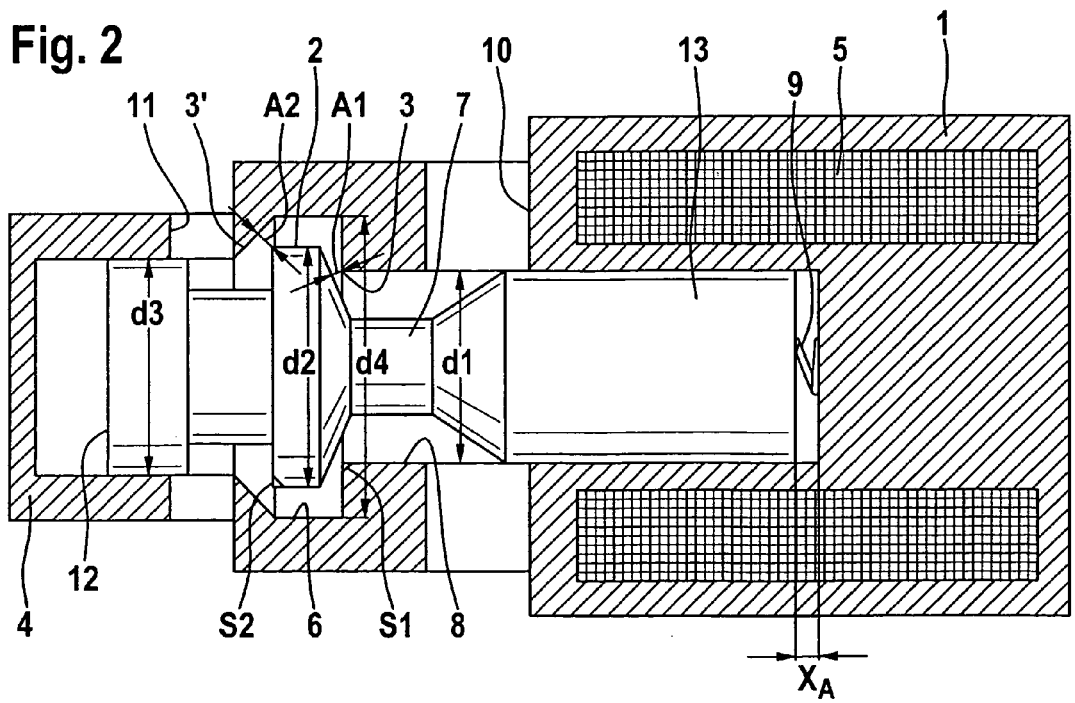
FIG. 2 shows the valve of FIG. 1 in another pressure control position, in which the exciting current corresponds to the minimum electric actuating current imin, whereby the desired fluid flow penetrates the valve under low fluid pressure, to what end a large surface of both valve opening cross-sections A1, A2 is opened due to the intermediate position of the valve closure member.

Different from FIG. 1, FIG. 2 shows the valve in a control position in which the exciting current corresponds to the minimum electric actuating current of the valve coil 12. The minimum exciting current imin causes the magnet armature 13 to displace the valve closure member 2 in opposition to the effect of the compression spring 9 into a stable intermediate position where member 2 is lifted from both valve seat surfaces 3, 3', in which position both flow cross-sections A1, A2 are opened and permit maximum fluid passage. In this pressure control position, the pressure control characteristic curve imin will thus develop, as illustrated in the diagram of FIG. 4, wherefrom a flat increase in pressure with increasing volume flow Q can be taken.

Figure 3:
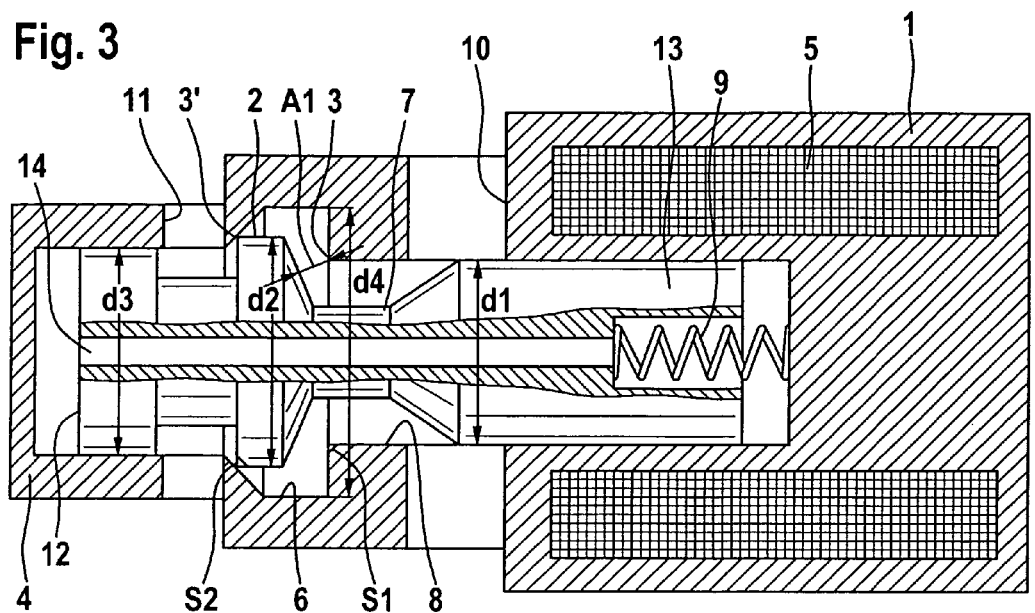
FIG. 3 shows the valve of FIG. 1 in a position in which the valve is not actuated electrically (exciting current i=0) or is not actuatable (fail-safe position), and the first valve opening cross-section A1 is completely opened and the second valve opening-cross-section A2 is closed except for a restrictor orifice S1 for pressure and flow limitation to desired, invariably adjusted values.

FIG. 3 shows the valve in a position in which the valve is not actuated electrically (exciting current i=0) or is not actuatable (fail-safe position). In this state, the valve closure member 2, under the effect of compression spring 9, first bears against the second valve seat surface 3', with the result that the second valve opening cross-section A2 is quasi closed with the exception of the fluid flow through the restrictor orifice S2. Due to the restrictor effect, initially the steep course of characteristic curve in the zone I develops, as can be seen in FIG. 4. With increasing fluid flow, the hydraulic pressure that acts on the end surfaces of the valve subassembly will rise to such an extent that the valve closure member 2, in opposition to the effect of the compression spring 9, will lift after hydraulic actuation from the valve seat surface 3', with the result that the pressure/volume flow characteristic curve in FIG. 4 exhibits a course that is characteristic of the design of the pressurized valve surfaces, with the exciting current i=0 in zone II.

Corresponding to the diagram in FIG. 4, any group of curves desired can be represented by any number of positions of the valve closure member 2 depending on the magnitude of the exciting current I, and three courses of characteristic curves have explicitly been drafted as an example by way of FIGS. 1 to 3. The increase in pressure p is plotted in each case on the ordinate of the diagram, while the volume flow Q is plotted alongside the abscissa. The steeper rise of the characteristic curve for i=imax in relation to the characteristic curve for the condition i=0 is achieved because the restrictor orifice S1 is smaller than the restrictor orifice S2. The largest flow cross-sections A1, A2 are obtained in the area of the two restrictor orifices S1, S2 for the condition that i=imin, whereby a particularly unthrottled and, hence, flat course of characteristic curves illustrates the maximum fluid passage through the valve. In the specific use of the valve at issue for a shock absorber, this means that the effect of the shock absorber increases with a steeper course of characteristic curve.

The invention claimed is:

1. An electrically controllable valve for an adjustable shock absorber, comprising:

a valve housing, an actuating drive, a first valve seat surface, a second valve seat surface, a valve closure member operable by the actuating drive, which is movable into abutment on the first or the second valve seat surface in the valve housing, the first and second valve surfaces being arranged in series connection to change a first and a second valve opening cross-section reciprocally in proportion to each other by means of the valve closure member, said valve further comprising an axial working air gap of the electric actuating drive arranged on a side of a magnet armature that cooperates with the valve closure member, said side facing away from the valve closure member, so that upon electric actuation of the actuating drive, the valve closure member is movable by the actuating drive in the direction of the first valve seat surface, wherein a first restrictor orifice is arranged between the first valve seat surface and the valve closure member, the restrictor cross-section whereof is smaller than a second restrictor orifice arranged between the second valve seat surface and the valve closure member.

2. The valve as claimed in claim 1,
wherein the hydraulic flow forces that develop when fluid flows through the valve, are compensated at least partly by the geometry of the valve closure member, the geometry of the second valve seat surface, and by the geometry of the magnet armature.

3. The valve as claimed in claim 2,
wherein the valve closure member has a geometry configured as an inclined shoulder in the direction of the first valve seat surface.

4. The valve as claimed in claim 2,
wherein the second valve seat surface is configured as a conical sealing seat.

5. The valve as claimed in claim 2,
wherein the magnet armature has a conical end surface in the direction of the valve closure member.

* * * * *